United States Patent [19]
Ono et al.

[11] Patent Number: 5,341,138
[45] Date of Patent: Aug. 23, 1994

[54] STRUCTURE OF RECEPTION FREQUENCY CONVERTING PORTION IN A MULTI-BAND MICROWAVE DETECTOR

[75] Inventors: Hisao Ono, Okazaki; Takeshi Hatasa, Toyoto, both of Japan

[73] Assignee: Yupiteru Industries Co., Ltd., Tokyo, Japan

[21] Appl. No.: 32,261

[22] Filed: Mar. 17, 1993

[30] Foreign Application Priority Data

Mar. 24, 1992 [JP] Japan .................... 4-066188

[51] Int. Cl.$^5$ ............ G01S 7/40; H04B 1/26; H01P 7/06
[52] U.S. Cl. .................... 342/20; 333/230; 331/107 DP; 455/319
[58] Field of Search .......... 342/20; 333/212, 230; 455/319; 331/107 DP

[56] References Cited

U.S. PATENT DOCUMENTS

| | | |
|---|---|---|
| 4,571,593 | 2/1986 | Martinson ............... 343/783 |
| 4,939,521 | 7/1990 | Burin ..................... 342/20 |
| 4,952,936 | 8/1990 | Martinson ............... 342/20 |
| 4,961,074 | 10/1990 | Martinson ............... 342/20 |

*Primary Examiner*—Gilberto Barrón, Jr.
*Attorney, Agent, or Firm*—Wenderoth, Lind & Ponack

[57] ABSTRACT

A structure of a reception frequency converting portion of a multi-band microwave detector, and including a microwave circuit comprises a horn antenna, two-port cavity integrally formed with the horn antenna and having one port communicated with a throat portion of the horn antenna, one-port cavity integrally formed with the two-port cavity and communicated with the other port of the two-port cavity, a mixer diode located at the throat portion of the horn antenna, a first local oscillator arranged within the two-port cavity, and a second local oscillator arranged within the one-port cavity.

7 Claims, 3 Drawing Sheets

STRUCTURE OF RECEPTION FREQUENCY CONVERTING PORTION IN A MULTI-BAND MICROWAVE DETECTOR

BACKGROUND OF THE INVENTION

1. Field of the Invention

The present invention relates generally to a microwave energy for detecting a microwave transmitted from measurement equipment.

More specifically, the invention relates to the structure of a reception frequency converting portion of the microwave detector for frequency mixing a reception wave and an output of a local oscillator.

2. Description of the Related Art

Multi-band microwave detectors, such as so-called radar detectors which are adapted to detect microwaves transmitted from radar type speed measurement equipments for use in generating an alarm, have been known in the prior art. For example, U.S. Pat. No. 4,571,593, issued on Feb. 18, 1976 to Martinson, U.S. Pat. No. 4,939,521, issued on Jul. 3, 1990 to Burin, U.S. Pat. No. 4,961,074, issued on Oct. 2, 1990 to Martinson disclose radar detectors of the type that the present invention is directed. In the case of typical traffic monitoring radar type speed measuring equipment (hereinafter referred to as "radar") microwaves in a plurality of frequency bands are employed, i.e. 10 GHz band (X band), 24 GHz band (K band) and 35 GHz band (Ka band). The known radar detectors receive the microwaves transmitted from the radar through a heterodyne type receiver circuit, such as a super-heterodyne receiver circuit.

In such a type the microwave detector, a horn antenna is generally employed as a reception antenna. At a feeding point in a throat portion of the horn antenna, a mixing diode is provided. A microwave circuit comprising a local oscillator is provided inside of the throat portion of the horn antenna. The mixing diode performs frequency mixing of the reception signal received by the horn antenna and the output of the local oscillator. Also, in order to avoid the affect of the reception input through the horn antenna for operation of the local oscillator, an appropriate filter is provided between the mixing stage and the local oscillator. In the known art, there is a type having a construction in which the mixer and the local oscillator are formed by a microwave circuit employing a wave guide tube. Also, it is known to form the mixer and the local oscillator with a microwave IC employing a microstrip line.

For constructing a multi-band microwave detector covering all of the above-mentioned X band, K band and Ka band, it is not possible to cover all reception bands using a single local oscillator, and it is necessary to provide two local oscillators having mutually different frequency bands. In such a case, two local oscillators are selectively operated in a time sharing manner to switch the reception band. By such an arrangement, multi-band reception can be realized with the single horn antenna and the single mixer. One example of the microwave detector of this type has been disclosed in U.S. Pat. No. 4,952,936.

In the prior art disclosed in the above-mentioned U.S. Pat. No. 4,952,936, a microwave IC is formed with a mixer circuit and two local oscillators. The microwave IC employing the microstrip line is certainly beneficial with respect to the viewpoints of downsizing and making the circuit alignment free. However, a high precision in patterning of the strip conductor on a dielectric substrate is required, and thus high designing skill is necessary. This results in disadvantages in the viewpoint of machining precision requirements and production yield in production of the parts.

In this respect, the microwave circuit employing the wave guide tube permits easy adjustment of the characteristics by aligning means, such as an iris, pin or so forth, even after assembling the main body of the microwave circuit. Furthermore, know-how in the adjustment technology have been accumulated for many years. Accordingly, in view of the overall production, the microwave circuit is superior over the microwave IC. However, in the prior art, there is no multi-band microwave detector having a single horn antenna, single mixer and two local oscillators employing the microwave circuit.

SUMMARY OF THE INVENTION

Therefore, it is an object of the present invention to realize a multi-band microwave detector having a single horn antenna, single mixer and two local oscillators employing the microwave circuit.

In order to accomplish the above-mentioned and other objects, a structure of a reception frequency converting portion of a multi-band microwave detector, according to one aspect of the present invention, including a microwave circuit comprises:

a horn antenna;

two-port cavity integrally formed with said horn antenna and having one port communicated with a throat portion of said horn antenna;

one-port cavity integrally formed with said two-port cavity and communicated with the other port of said two-port cavity;;

a mixer diode located at said throat portion of said horn antenna;

a first local oscillator provided within said two-port cavity; and a second local oscillator provided within said one-port cavity.

According to another aspect of the invention, a multi-band microwave detector comprises:

a main body defining a horn antenna, a first cavity communicated with said horn antenna through a throat portion, and a second cavity communicated with said first cavity;

a microwave circuit including a mixing means located in said throat portion, a first local oscillator located within said first cavity and a second local oscillator located within said second cavity, said first and second local oscillators being operated in time sharing basis.

In the above-mentioned construction, the first and second local oscillators are installed on a single printed circuit board disposed in both of said first and second cavities.

The multi-band microwave detector may further comprise a plurality of adjusting elements mounted on said main body for adjustment of oscillation characteristics of the respective first and second oscillators. In this case, the adjusting elements include a first adjusting element located in opposition to said first oscillator and a second adjusting element located in oppsition to said second oscillator and a third adjusting element located close to said mixing means.

Also, the multi-band microwave detector may further form a filter disposed between said mixing means and said first and second oscillators, in that said first and second cavities are arranged so that said first cavity serves as a resonating element for said filter while said second oscillator is active, and said second cavity serves as a non-reflectively terminated impedance while said first oscillator is active.

As set forth herein, since the second cavity serves as the non-reflectively terminated impedance while the first oscillator is in active state, optimal characteristics can be easily achieved by simple adjustment of the adjusting means. Also, since the first cavity simply serves as the resonating element for the filter while the second oscillator is active, optimal characteristics can be easily attained by simple adjustment of the adjusting means.

BRIEF DESCRIPTION OF THE DRAWINGS

The present invention will be understood more fully from the detailed description given herebelow and from the accompanying drawings of the preferred embodiment, which, however, should not be taken to be limitative to the invention but are for explanation and understanding only.

In the drawings.

DESCRIPTION OF THE PREFERRED EMBODIMENT

Figure 1:
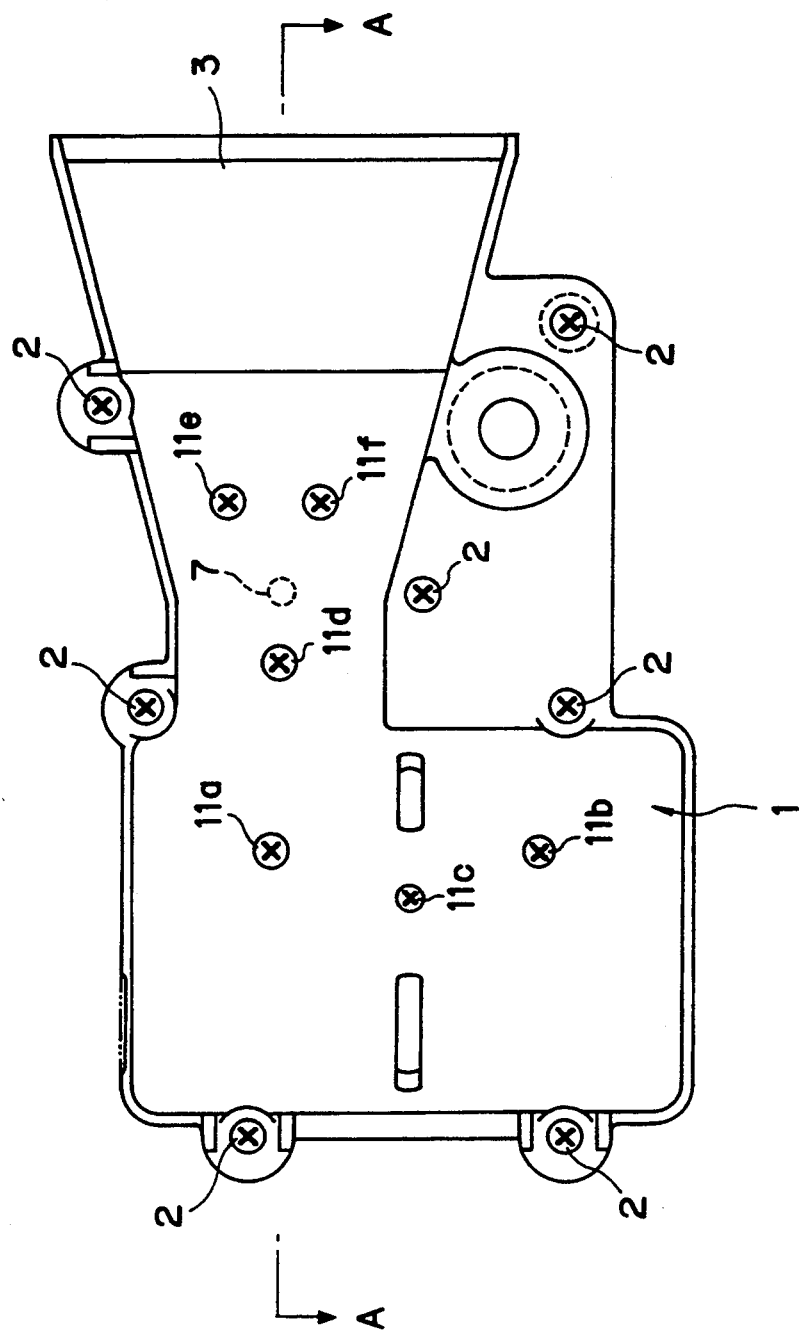
FIG. 1 is a plan view of a reception frequency converting portion in one embodiment of a multi-band microwave detector according to the invention.
Figure 2:
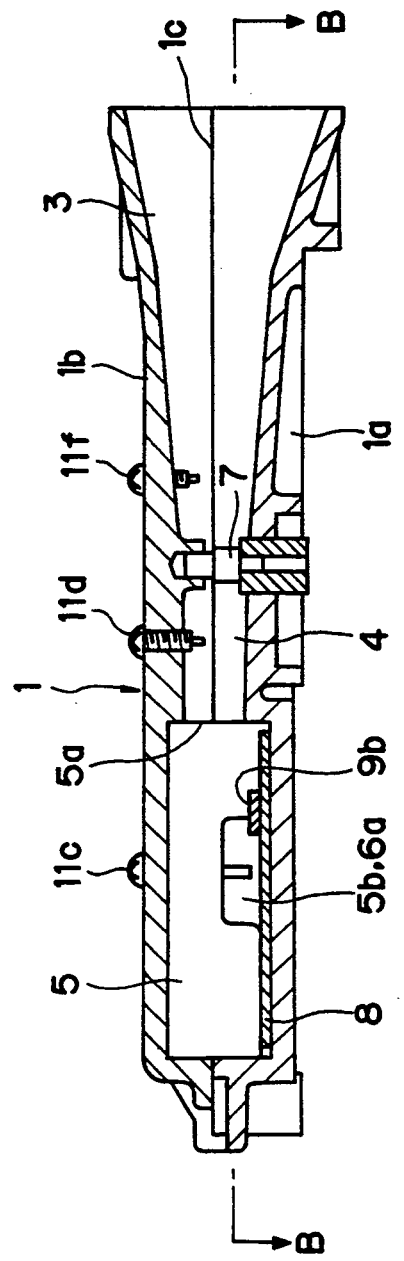
FIG. 2 is a section taken along line A—A of FIG. 1.
Figure 3:
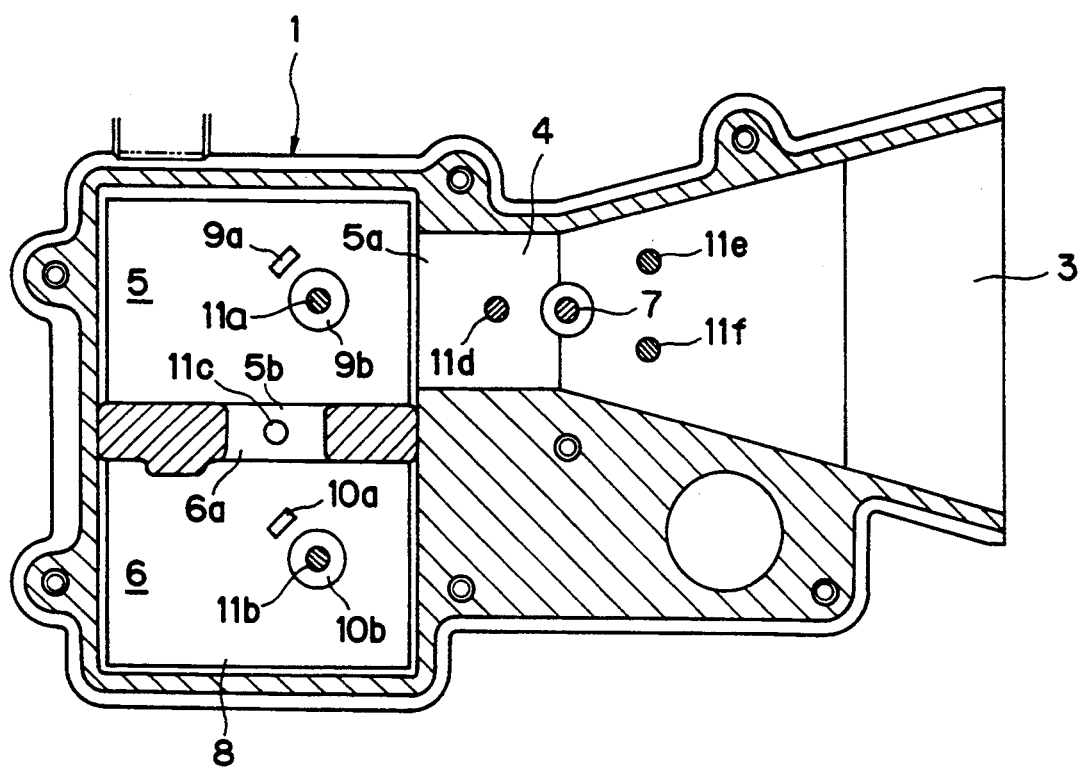
FIG. 3 is a section taken along line B—B of FIG.

Referring now to the drawings, FIGS. 1 to 3 illustrates a structure of a reception frequency converting portion in one embodiment of a microwave detector according to the invention. A microwave circuit main body 1 is constructed with aluminum die-casted base 1a and cover 1b which are formed into mutually symmetric configuration. The base 1a and the cover 1b are assembled in mutually opposing relationship at a parting line 1c and secured to each other by means of a plurality of fasteners, e.g. seven screws in the illustrated embodiment. The microwave circuit main body 1 thus formed receives elements forming the microwave circuit which will be discussed herebelow.

The microwave circuit main body 1 includes a horn antenna 3, a two-port cavity 5 and a one-port cavity 6. The two-port cavity 5 is arranged immediate inside of a throat portion 4 of the horn antenna 3. The one-port cavity 6 is arranged adjacent the two-port cavity 5. Both of the two-port cavity 5 and the one-port cavity 6 are formed as parallelpiped configuration cavities.

One port 5a of the two-port cavity is directly communicated with the throat portion 4 of the horn antenna 3. The other port 5b is in direct communication with a port 6a of the one-port cavity 6.

At a feeding point in the throat portion 4 of the horn antenna 3, a mixer diode 7 is mounted. On the other hand, a printed circuit board 8 is arranged from the two-port cavity 5 through the one-port cavity 6 therein. On the part of the printed circuit board 8 disposed in the two-port cavity 5, a FET 9a and a dielectric resonator element 9b forming a first local oscillator are installed. Similarly, on the part of the printed circuit board 8 disposed in the one-port cavity 6, a FET 10a and a dielectric resonator element 10b forming a second local oscillator are installed.

On the other hand, six pin aligning members 11a~11f of a screw adjusting type are mounted on the microwave circuit main body 1. The pin aligning member 11a is mounted just above the dielectric resonator element 9b of the first local oscillator. The pin aligning member 11b is mounted just above the dielectric resonator element 10b of the second oscillator. The pin aligning member 11c is mounted above the connection passage between the port 5b of the two-port cavity 5 and the port 6a at of the one-port cavity 6. The pin aligning member 11d is mounted at the center of the throat portion 4 of the horn antenna 3. The pin aligning members 11e and 11f are mounted at left and right sides of the front side of the throat portion 4 of the horn antenna 3.

The first local oscillator 9a, 9b in the two-port cavity 5 and the second local oscillator 10a, 10b in the one-port cavity 6 operate alternately in a time sharing manner. When the first local oscillator 9a, 9b in the two-port cavity 5 is active, the local oscillation output thereof is output to the throat portion 4 of the horn antenna 3 through the port 5a of the two-port cavity 5. Then, the local oscillation output of the first local oscillator 9a, 9b is subject to frequency mixing with the antenna input. During this operation, the one-port cavity 6 serves as non-reflectively terminated impedance.

On the other hand, when the second local oscillator 10a, 10b in the one-port cavity 6 is active, the local oscillation output thereof is output to the throat portion 4 of the horn antenna 3 through ports 6a, 5b, the two-port cavity 5 and the port 5a and subject to frequency mixing with the antenna input. During this operation, the two-port cavity 5 serves as a resonating element of a filter.

With the shown construction, the characteristics at the active state of the first local oscillator and at the active state of the second local oscillator can be adjusted optimally by adjusting the six aligning members 11a~11f.

As set forth above, according to the present invention, since the two-port cavity and the one-port cavity are connected in series and arranged at the inner side relative to the throat portion of the horn antenna, the mixer diode is provided in the throat portion of the antenna, and the first and second local oscillators are respectively provided in the two-port cavity and the one port cavity, it becomes possible to easily optimize the operation characteristics of two local oscillators by means of simple adjusting means, such as the pin aligning members, provided at effective points of the microwave circuit. Therefore, the multi-band microwave detector including the single horn antenna, the single mixer and two local oscillators can be formed with the microwave circuit which is easy to design produce and adjust.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

For instance, the present invention is applicable for the microwave detectors disclosed in the commonly owned co-pending U. S. patent application Ser. No. 08/045,103, filed Mar. 31, 1993, entitled "Power Saving Type Multi-Band Microwave Detector", U.S. patent application Ser. No. 08/025,632, filed Mar. 2, 1993, entitled "Multi-Band Microwave Detector" and U.S. patent application Ser. No. 08/051,648, filed Apr. 26, 1993, entitled "Structure of Multi-Band Microwave Detector". Disclosures of the above-identified co-pending U.S. Patent Applications are herein incorporated by reference.

What is claimed is:

1. A structure of a reception frequency converting portion of a multi-band microwave detector, and including a microwave circuit comprising:
   a horn antenna;
   two-port cavity integrally formed with said horn antenna and having one port communicated with a throat portion of said horn antenna;
   one-port cavity integrally formed with said two-port cavity and communicated with the other port of said two-port cavity;;
   a mixer diode located at said throat portion of said horn antenna;
   a first local oscillator provided within said two-port cavity; and
   a second local oscillator provided within said one-port cavity.

2. A multi-band microwave detector comprising:
   a main body defining a horn antenna, a first cavity communicated with said horn antenna through a throat portion, and a second cavity communicated with said first cavity;
   a microwave circuit including a mixing means located in said throat portion, a first local oscillator located within said first cavity and a second local oscillator located within said second cavity, said first and second local oscillators being operated in time sharing basis.

3. A multi-band microwave detector as set forth in claim 2, wherein said first and second local oscillators are installed on a single printed circuit board disposed in both of said first and second cavities.

4. A multi-band microwave detector as set forth in claim 2, which further comprises a plurality of adjusting elements mounted on said main body for adjustment of oscillation characteristics of respective of first and second oscillators.

5. A multi-band microwave detector as set forth in claim 4, wherein said adjusting elements include a first adjusting element located in opposition to said first oscillator and a second adjusting element located in opposition to said second oscillator and a third adjusting element located close to said mixing means.

6. A multi-band microwave detector as set forth in claim 2, said first and second cavities having a configuration in which said first cavity serves as a resonating element disposed between said second oscillator and said mixing means while said second oscillator is active, and said second cavity serves as a non-reflectively terminated impedance while said first oscillator is active.

7. A multi-band microwave detector as set forth in claim 6, wherein said first cavity serves as a waveguide transmitting line having a matched impedance, and the matched impedance waveguide transmitting line serves as a waveguide resonating element of a waveguide filter which eliminates undesirable frequency signals.

* * * * *